United States Patent
Sakuma

(10) Patent No.: US 10,920,634 B2
(45) Date of Patent: Feb. 16, 2021

(54) EXHAUST AFTER TREATMENT SYSTEM

(71) Applicant: TOYOTA JIDOSHA KABUSHIKI KAISHA, Toyota (JP)

(72) Inventor: Tetsuya Sakuma, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/529,274

(22) Filed: Aug. 1, 2019

(65) Prior Publication Data

US 2020/0080453 A1 Mar. 12, 2020

(30) Foreign Application Priority Data

Sep. 6, 2018 (JP) .............................. JP2018-166938

(51) Int. Cl.
*F01N 3/20* (2006.01)
*B01D 53/86* (2006.01)
*B01D 53/94* (2006.01)

(52) U.S. Cl.
CPC ............. *F01N 3/202* (2013.01); *B01D 53/86* (2013.01); *B01D 53/94* (2013.01); *F01N 2240/18* (2013.01); *F01N 2570/12* (2013.01)

(58) Field of Classification Search
CPC ............ B01D 2258/01; B01D 53/9481; F01N 13/009; F01N 2430/06; F01N 2900/1602; F01N 2900/1614; F01N 3/0807; F01N 3/0814; F01N 3/0835; F01N 3/0842; F01N 9/00; F02D 41/0235; F02D 41/10
See application file for complete search history.

(56) References Cited

U.S. PATENT DOCUMENTS

| | | | | |
|---|---|---|---|---|
| 5,063,029 A * | 11/1991 | Mizuno | ................. | F01N 3/2803 422/175 |
| 5,376,610 A * | 12/1994 | Takahata | ............. | F01N 13/0097 502/66 |
| 5,538,697 A * | 7/1996 | Abe | ........................ | B01J 35/04 422/171 |
| 5,662,869 A * | 9/1997 | Abe | ...................... | F01N 3/2006 422/171 |
| 6,708,484 B2 * | 3/2004 | Onodera | ............ | B01D 53/9454 60/286 |
| 8,491,860 B2 * | 7/2013 | Lambert | ............. | B01D 53/9468 423/213.2 |
| 9,777,609 B2 * | 10/2017 | Chandler | ................ | F01N 3/103 |
| 2019/0353067 A1 * | 11/2019 | Moser | .................... | B01J 23/464 |

FOREIGN PATENT DOCUMENTS

| | | |
|---|---|---|
| JP | H06-336915 A | 12/1994 |
| JP | H09-173778 A | 7/1997 |

\* cited by examiner

*Primary Examiner* — Jesse S Bogue
(74) *Attorney, Agent, or Firm* — Oliff PLC

(57) ABSTRACT

An exhaust after treatment system provided in an exhaust passage of an internal combustion engine, comprising an adsorption layer having the function of adsorbing hydrocarbons in the exhaust, a catalyst layer arranged at the same position as the adsorption layer in the direction of flow of exhaust or at the downstream side from the adsorption layer and having an oxidation function of oxidizing the hydrocarbons, and a thermal energy generator generating thermal energy, in the thermal energy generated by the thermal energy generator, the thermal energy supplied to the catalyst layer being made larger than the thermal energy supplied to the adsorption layer.

5 Claims, 12 Drawing Sheets

EXHAUST AFTER TREATMENT SYSTEM

FIELD

The present disclosure relates to an exhaust after treatment system.

BACKGROUND

Japanese Unexamined Patent Publication No. 9-173778 discloses an electrical heated type catalyst device (EHC) configured to use a conductive substrate which generates heat upon being energized so as to be able to heat a catalyst supported on that substrate.

SUMMARY

In the disclosure described in Japanese Unexamined Patent Publication No. 9-173778, the surface of the substrate was coated with an HC adsorption catalyst having the function of adsorbing hydrocarbons so as to form an adsorption layer and the surface of the adsorption layer was coated with a three-way catalyst to form a catalyst layer. For this reason, the thermal energy generated at the substrate by energization of the substrate was always supplied more to the adsorption layer than the catalyst layer, so the temperature elevation rate of the adsorption layer became faster than the temperature elevation rate of the catalyst layer.

However, the desorption temperature at which hydrocarbons are desorbed from the adsorption layer is lower than an oxidation activation temperature at which an oxidation function of oxidizing hydrocarbons is activated at the catalyst layer. For this reason, in the disclosure described in Japanese Unexamined Patent Publication No. 9-173778, before the temperature of the catalyst layer became the oxidation activation temperature, the temperature of the adsorption layer ended up becoming the desorption temperature, the hydrocarbons desorbed from the adsorption layer could not be removed at the catalyst layer, and the amount of external discharge of hydrocarbons before the oxidation function of the catalyst layer became activated was liable to increase.

The present disclosure was made focusing on such a problem and has as its object to keep a temperature of an adsorption layer from becoming a desorption temperature before a temperature of a catalyst layer becomes an oxidation activation temperature and to keep down an amount of external discharge of hydrocarbons before an oxidation function of the catalyst layer becomes activated.

To solve this problem, according to one aspect of the present disclosure, there is provided an exhaust after treatment system provided in an exhaust passage of an internal combustion engine. The system is comprised of an adsorption layer having the function of adsorbing hydrocarbons in the exhaust, a catalyst layer arranged at the same position as the adsorption layer in the direction of flow of exhaust or at the downstream side from the adsorption layer and having an oxidation function of oxidizing the hydrocarbons desorbed from the adsorption layer, and a thermal energy generator generating thermal energy. In the thermal energy generated by the thermal energy generator, the thermal energy supplied to the catalyst layer is made larger than the thermal energy supplied to the adsorption layer.

According to this aspect of the present disclosure, it is possible to keep the temperature of the adsorption layer from becoming the desorption temperature before the temperature of the catalyst layer becomes the oxidation activation temperature, so it is possible to keep down the amount of external discharge of hydrocarbons before the oxidation function of the catalyst layer is activated.

DESCRIPTION OF EMBODIMENTS

Figure 1:
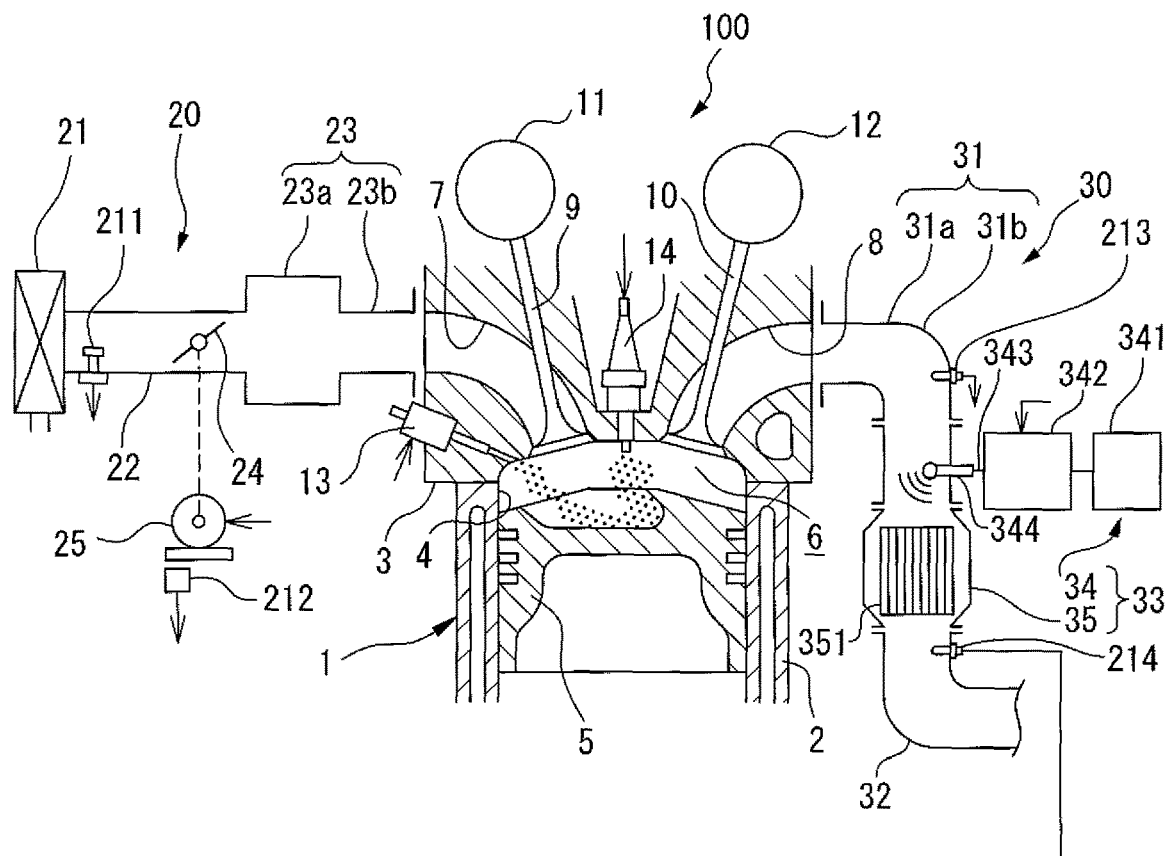
FIG. 1 is a schematic view of the configuration of an internal combustion engine and an electronic control unit controlling the internal combustion engine according to a first embodiment of the present disclosure.
Figure 1:
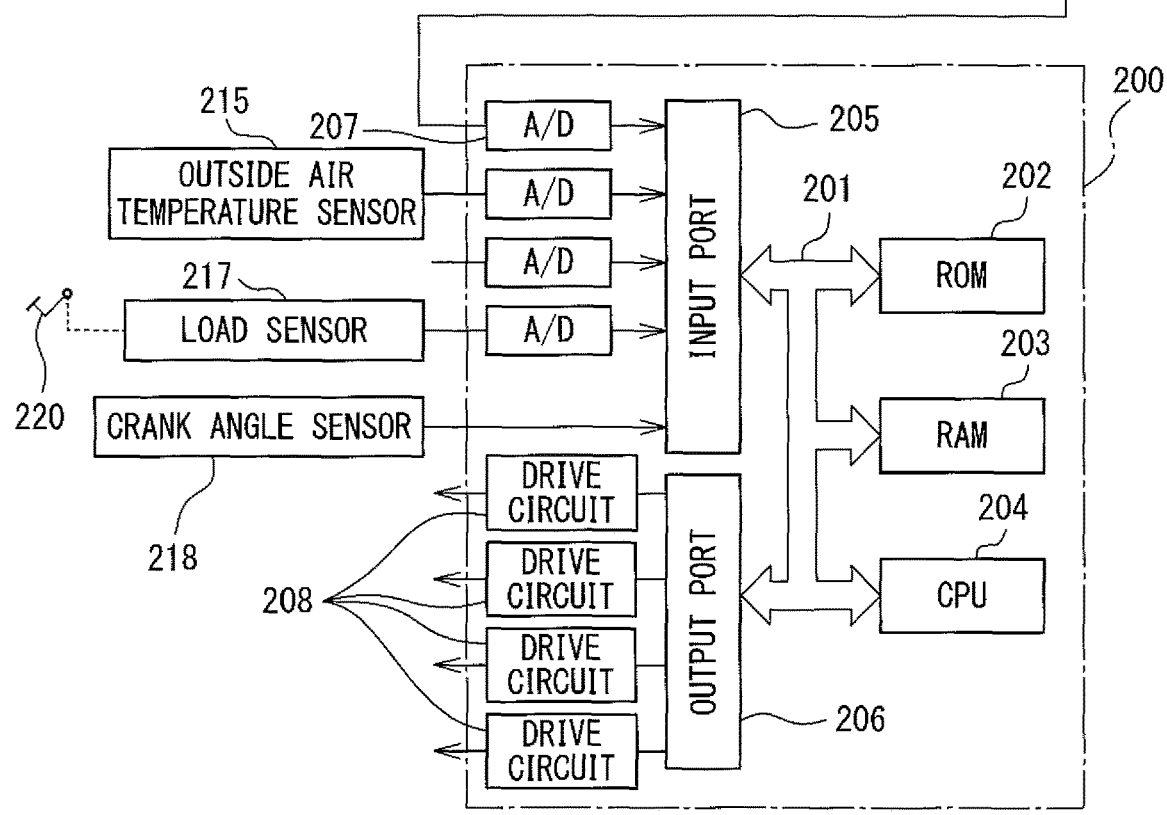

Below, referring to the drawings, embodiments of the present disclosure will be explained in detail. Note that, in the following explanation, similar component elements are assigned the same reference notations.

First Embodiment

FIG. 1 is a schematic view of a configuration of an internal combustion engine 100 and an electronic control unit 200 for controlling the internal combustion engine 100 according to a first embodiment of the present disclosure.

The internal combustion engine 100 is provided with an engine body 1, intake system 20, and exhaust system 30. The internal combustion engine 100, for example, is mounted in a vehicle and generates drive power for driving the vehicle.

The engine body 1 is provided with a cylinder block 2 and a cylinder head 3 fixed to a top surface of the cylinder block 2.

The cylinder block 2 is formed with a plurality of cylinders 4. Inside of each cylinder 4, a piston 5 which receives combustion pressure and reciprocates inside the cylinder 4 is held. The pistons 5 are connected through connecting rods (not shown) to a crankshaft (not shown). Due to the crankshaft, the reciprocating motions of the pistons 5 are converted to rotary motion. The spaces defined by the inside wall surface of the cylinder head 3, the inside wall surfaces of the cylinders 4, and the piston crowns form combustion chambers 6.

The cylinder head 3 is formed with intake ports 7 which open to make to one side of the cylinder head 3 and open to the combustion chambers 6 and exhaust ports 8 which open to the other side of cylinder head 3 and open to the combustion chambers 6.

Further, the cylinder head 3 has attached to it intake valves 9 for opening and closing the openings of the combustion chambers 6 and intake ports 7, exhaust valves 10 for opening and closing the openings of the combustion chambers 6 and exhaust ports 8, intake cam shafts 11 for driving operation of the intake valves 9, and exhaust cam shafts 12 for driving operation of the exhaust valves 10.

Still further, the cylinder head 3 has attached to it fuel injectors 13 for injecting fuel inside the combustion chambers 6 and spark plugs 14 for igniting the air-fuel mixture of the fuel injected from the fuel injectors 13 and the air inside the combustion chambers 6. In the present embodiment, as the fuel, gasoline having a stoichiometric air-fuel ratio of 14.6 is used, but other fuel may also be used. Note that, the fuel injectors 13 may also be attached so as to inject fuel inside the intake ports 7.

The intake system 20 is a system for guiding air through the intake ports 7 to the insides of the cylinders 4 and is provided with an air cleaner 21, intake pipe 22, intake manifold 23, electronic control type throttle valve 24, and air flow meter 211.

The air cleaner 21 removes sand and other foreign matter contained in the air.

The intake pipe 22 is connected at one end to the air cleaner 21 and is connected at the other end with a surge tank 23a of the intake manifold 23. Due to the intake pipe 22, air flowing through the air cleaner 21 to the inside of the intake pipe 22 (intake) is guided to the surge tank 23a of the intake manifold 23.

The intake manifold 23 is provided with the surge tank 23a and a plurality of intake runners 23b branched from the surge tank 23a and connected to the openings of the intake ports 7 formed at the side surface of the cylinder head. The air guided to the surge tank 23a is evenly distributed through the intake runners 23b to the insides of the cylinders 4. In this way, the intake pipe 22, the intake manifold 23, and intake ports 7 form intake passages for guiding air to the insides of the cylinders 4.

The throttle valve 24 is provided inside the intake pipe 22. The throttle valve 24 is driven by a throttle actuator 25 and changes the passage cross-sectional area of the intake pipe 22 continuously or in stages. By using the throttle actuator 25 to adjust the opening degree of the throttle valve 24 (below, referred to as the "throttle opening degree"), the amounts of intake sucked into the cylinders 4 are adjusted. The throttle opening degree is detected by a throttle sensor 212.

The air flow meter 211 is provided inside of the intake pipe 22 at the upstream side from the throttle valve 24. The air flow meter 211 detects the amount of flow of air flowing through the inside of the intake pipe 22 (below, referred to as the "intake amount").

The exhaust system 30 is a system for purifying the combustion gas (exhaust gas) generated inside the combustion chambers 6 and discharging it to the outside air and is provided with an exhaust manifold 31, exhaust pipe 32, exhaust after treatment system 33, air-fuel ratio sensor 213, and exhaust temperature sensor 214.

The exhaust manifold 31 is provided with a plurality of exhaust runners 31a connected to openings of exhaust ports 8 formed at the side surface of the cylinder head and a header pipe 31b gathering the exhaust runners 31a and combining them into one.

The exhaust pipe 32 is connected at one end to the header pipe 31b of the exhaust manifold 31 and opens at the other end to the outside air. The exhaust discharged from the cylinders 4 through the exhaust ports 8 to the exhaust manifold 31 flows through the exhaust pipe 32 and is discharged to the outside air.

The exhaust after treatment system 33 is provided with a microwave irradiation device 34 and a catalytic converter 35.

The microwave irradiation device 34 is provided with a microwave power supply 341, a microwave generator 342, a transmission cable 343, and a microwave irradiation antenna 344.

The microwave power supply 341 is electrically connected to the microwave generator 342 and supplies the microwave generator 342 with the electric power required for the microwave generator 342 to generate microwaves. The microwave power supply 341 may also be a dedicated power supply. Further, if the internal combustion engine 100 is mounted in a vehicle, it may also be the vehicular use battery.

The microwave generator 342 is driven by the electric power of the microwave power supply 341 to generate a predetermined frequency of microwaves.

The transmission cable 343 is a cable for transmitting the microwaves generated by the microwave generator 342 to the microwave irradiation antenna 344. One end is connected to the microwave generator, while the other end is connected to the microwave irradiation antenna 344.

The microwave irradiation antenna 344 is arranged at the inside of the exhaust pipe 32 positioned at the upstream side from the catalytic converter 35 in the direction of flow of exhaust. The microwave irradiation antenna 344 irradiates the microwaves transmitted through the transmission cable 343 to the catalytic converter 35.

Figure 2:
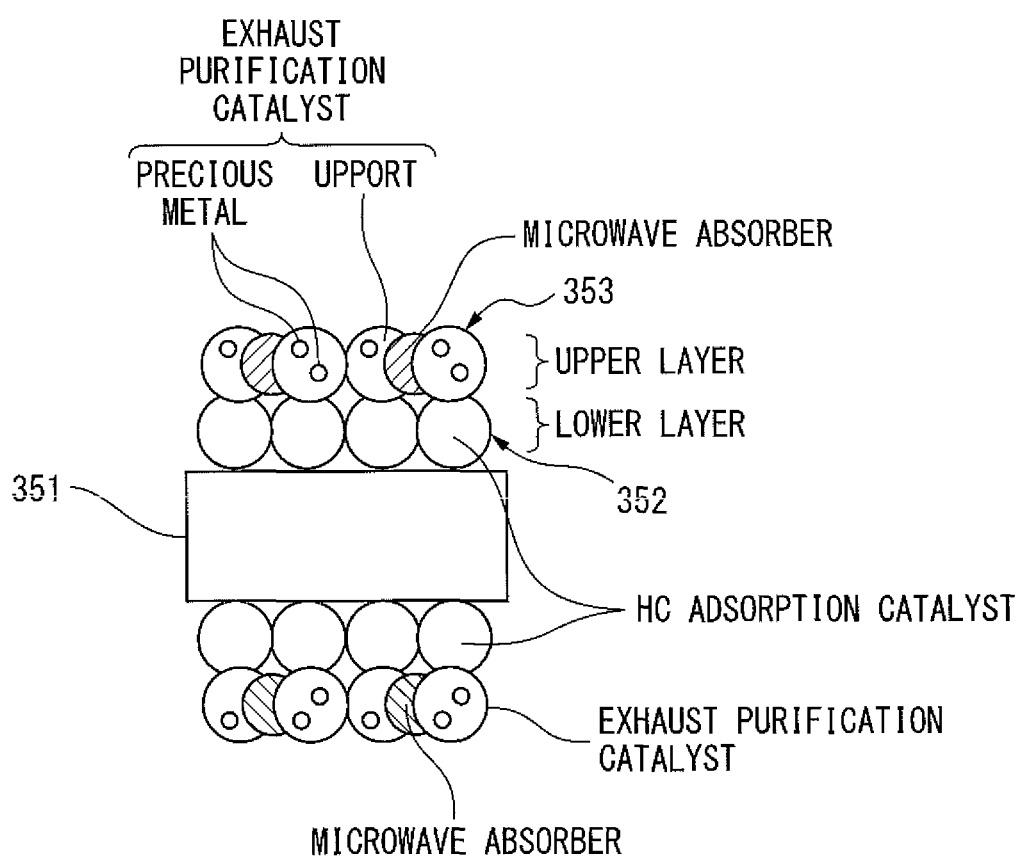
FIG. 2 is an enlarged view of principal parts of a substrate according to the first embodiment of the present disclosure along the direction of flow of exhaust.

The catalytic converter 35 is provided in the exhaust pipe 32 and is provided with a substrate 351 having a plurality of passages along the direction of flow of exhaust. FIG. 2 is an enlarged view of principal parts of the substrate 351 along the direction of flow of exhaust.

As shown in FIG. 2, the surface of the substrate 351 is formed with an adsorption layer 352 including an HC adsorption catalyst having the function of adsorbing harmful substances in the exhaust like hydrocarbons (HC) and a catalyst layer 353 including an exhaust purification catalyst having an oxidation function for oxidizing the hydrocarbons (for example, an oxidation catalyst or three-way catalyst).

At this time, in the present embodiment, in addition to the exhaust purification catalyst, a microwave absorber absorbing microwaves to generate heat is included in the catalyst layer 353. Further, in the present embodiment, the surface of the substrate 351 is formed with the adsorption layer 352, while the surface of the adsorption layer 352 is formed with the catalyst layer 353. That is, in the present embodiment, the adsorption layer 352 and the catalyst layer 353 are arranged at the same position in the direction of flow of exhaust and the adsorption layer 352 and the catalyst layer 353 are formed on the surface of the substrate 351 in layers so that the lower layer becomes the adsorption layer 352 and the upper layer becomes the catalyst layer 353. Below, the reasons will be explained. Note that, as the HC adsorption catalyst, for example, zeolite may be mentioned. As the exhaust purification catalyst, for example, alumina ($Al_2O_3$) or another support made to carry platinum (Pt) or palladium (Pd), rhodium (Rh) or other precious metals may be mentioned. As the microwave absorber, for example, silicon carbide particles (SiC particles) and other derivatives or ferrite and other magnetic materials may be mentioned.

To activate the oxidation function of the exhaust purification catalyst contained in the catalyst layer 353 to oxidize (remove) the hydrocarbons by the desired oxidation rate (removal rate), the temperature of the catalyst layer 353 has to be made to rise to a predetermined oxidation activation temperature Tact (for example, 300° C.). For this reason, for example, at the time of cold start of the internal combustion engine 100 or otherwise when the temperature of the catalyst layer 353 is less than the oxidation activation temperature Tact, it is not possible to make the hydrocarbons sufficiently oxidize at the catalyst layer 353 and the amount of external discharge of hydrocarbons is liable to increase.

As opposed to this, by forming the adsorption layer 352 like in the present embodiment, when the temperature of the catalyst layer 353 is less than the oxidation activation temperature Tact, it is possible to make the hydrocarbons in the exhaust discharged from the engine body 1 be temporarily adsorbed at the adsorption layer 352, so it is possible to keep down the amount of external discharge of the hydrocarbons.

However, the desorption temperature Tdes at which the hydrocarbons adsorbed at the adsorption layer 352 start to be desorbed from the adsorption layer 352 (for example, 150° C.) is lower than the oxidation activation temperature Tact. For this reason, if the state ends up being one where the temperature of the adsorption layer 352 is the desorption temperature Tdes or more and the temperature of the catalyst layer 353 is less than the oxidation activation temperature Tact, the hydrocarbons desorbed from the adsorption layer 352 can no longer be sufficiently removed at the catalyst layer 353 and the amount of external discharge of the hydrocarbons temporarily increases.

To keep down the temporary increase in the amount of external discharge of the hydrocarbons, when the temperature of the catalyst layer 353 is less than the oxidation activation temperature Tact, it is necessary to make the temperature of the catalyst layer 353 rise to the oxidation activation temperature Tact before the temperature of the adsorption layer 352 becomes the desorption temperature Tdes or more.

Therefore, in the present embodiment, the microwave irradiation device 34 is provided, the catalyst layer 353 is made to contain a microwave absorber, the adsorption layer 352 and the catalyst layer 353 are arranged at the same position in the direction of flow of exhaust, and the adsorption layer 352 and the catalyst layer 353 are formed on the surface of the substrate 351 in layers.

Due to this, by using the microwave irradiation device 34 to irradiate microwaves at the catalytic converter 35, it is possible to make the microwave absorber contained in the catalyst layer 353 generate heat and directly heat the catalyst layer 353 together with the microwave absorber. Further, if a certain extent of temperature difference arises between the catalyst layer 353 and the adsorption layer 352, it is possible to mainly use the heat transmitted from the catalyst layer 353 to indirectly heat the adsorption layer 352. For this reason, in the thermal energy generated by irradiating microwaves at the microwave absorber, it is possible to increase the thermal energy supplied to the catalyst layer 353 over the thermal energy supplied to the adsorption layer 352.

Therefore, it is possible to make the temperature elevation rate of the catalyst layer 353 faster than the temperature elevation rate of the adsorption layer 352, so it is possible to make the temperature of the catalyst layer 353 rise to the oxidation activation temperature Tact before the temperature of the adsorption layer 352 becomes the desorption temperature Tdes or more.

Returning to FIG. 1, the air-fuel ratio sensor 213 is provided at the header 31b of the exhaust manifold 31 and detects the air-fuel ratio of the exhaust flowing into the catalytic converter 35 (below, referred to as the "exhaust air-fuel ratio").

The exhaust temperature sensor 214 is provided at the exhaust pipe at the downstream side from the catalytic converter 35 and detects the temperature of the exhaust flowing out from the catalytic converter 35.

The electronic control unit 200 is comprised of a digital computer and is provided with components connected to each other by a bidirectional bus 201 such as a ROM (read only memory) 202, RAM (random access memory) 203, CPU (microprocessor) 204, input port 205, and output port 206.

The input port 205 receives as input not only the output signals of the above-mentioned air flow meter 211 etc. but also an output signal of an outside air temperature sensor 215 for detecting an outside air temperature through the corresponding AD converters 207. Further, the input port 205 receives as input, as a signal for detecting the engine load the output voltage of a load sensor 217 generating an output voltage proportional to the amount of depression of an accelerator pedal 220 (below, referred to as the "amount of accelerator depression") through a corresponding AD converter 207. Further, the input port 205 receives as input, as a signal for calculating the engine rotational speed etc., an output signal of a crank angle sensor 218 generating an output pulse every time a crankshaft of the engine body 1 rotates by for example 15°. In this way, the input port 205 receives as input the output signals of the various sensors required for control of the internal combustion engine 100.

The output port 206 is connected through the corresponding drive circuits 208 to the fuel injectors 13 and other controlled parts.

The electronic control unit 200 outputs control signals for controlling the various controlled parts to control the internal combustion engine 100 based on the output signals of the various sensors input to the input port 205.

The electronic control unit 200 controls the internal combustion engine 100 so that the exhaust air-fuel ratio detected by the air-fuel ratio sensor 213 becomes the target air-fuel ratio. Specifically, the electronic control unit 200 controls by feedback the amount of fuel injection from the fuel injectors 13 based on the exhaust air-fuel ratio so that the exhaust air-fuel ratio becomes the target air-fuel ratio.

Further, the electronic control unit 200 performs catalyst warm-up control for warming up the catalytic converter 35 at the time of cold start of the internal combustion engine 100 or otherwise when necessary to activate the oxidation function of the exhaust purification catalyst of the catalyst layer 353. Specifically, as explained above, the microwaves are irradiated so that the temperature of the catalyst layer 353 becomes the oxidation activation temperature Tact or more before the temperature of the adsorption layer 352 becomes the desorption temperature Tdes or more. In this case, the electronic control unit 200 functions as a control device of the exhaust after treatment system 33.

Figure 3:
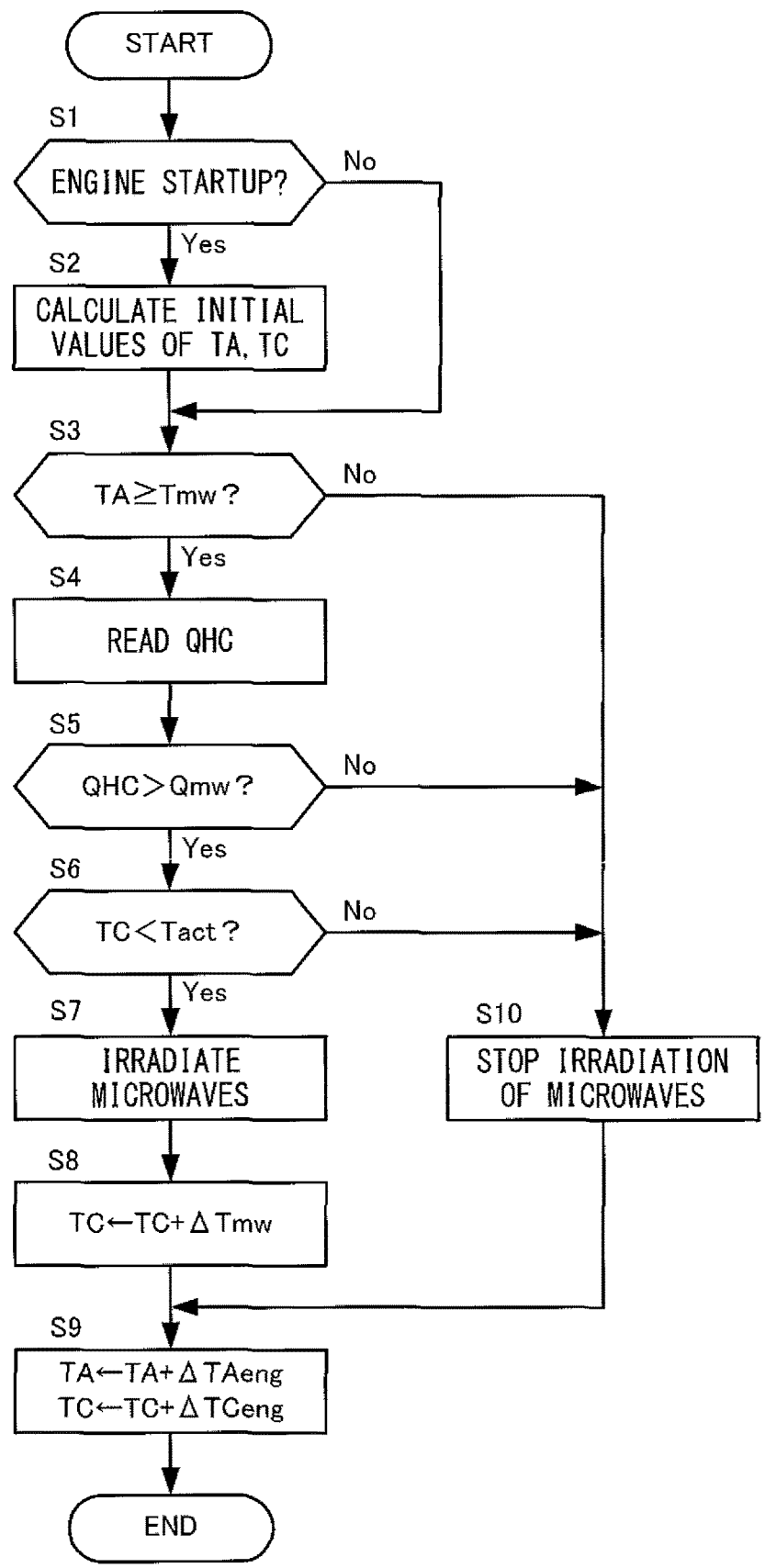
FIG. 3 is a flow chart explaining catalyst warm-up control according to the first embodiment of the present disclosure.

FIG. 3 is a flow chart explaining the catalyst warm-up control according to the present embodiment. The electronic control unit 200 repeats the present routine for example at predetermined processing cycles during operation of the internal combustion engine 100 (during engine operation).

At step S1, the electronic control unit 200 judges if it is time for startup of the internal combustion engine 100 (time for engine startup). The electronic control unit 200 proceeds to the processing of step S2 if it is time for engine startup. On the other hand, the electronic control unit 200 proceeds to the processing of step S3 if the time is the middle of engine operation after engine startup.

At step S2, the electronic control unit 200 calculates the initial values of the temperature TA of the adsorption layer 352 and the temperature TC of the catalyst layer 353. The initial values of the temperature TA of the adsorption layer 352 and the temperature TC of the catalyst layer 353 are the temperatures of the adsorption layer 352 and catalyst layer 353 at the time of engine startup. For example, they can be estimated based on the temperature TA of the adsorption layer 352 and the temperature TC of the catalyst layer 353 at the time when the internal combustion engine 100 was stopped the previous time or the elapsed time from when the internal combustion engine 100 was stopped the previous time, the external air temperature, the temperature of the cooling water of the internal combustion engine 100, etc.

At step S3, the electronic control unit 200 judges if the temperature TA of the adsorption layer 352 is a predetermined irradiation start temperature Tmw or more. If the temperature TA of the adsorption layer 352 is the irradiation start temperature Tmw or more, the electronic control unit 200 proceeds to the processing of step S3. On the other hand, if the temperature TA of the adsorption layer 352 is less than the irradiation start temperature Tmw, the electronic control unit 200 proceeds to the processing of step S10.

The irradiation start temperature Tmw is the temperature of the adsorption layer 352 becoming the threshold value for starting microwave irradiation to the microwave absorber contained in the catalyst layer 353 and is set to a temperature lower than the desorption start temperature Tdes. In the present embodiment, the irradiation start temperature Tmw is set to a temperature enabling the temperature TC of the catalyst layer 353 to be raised to the oxidation activation temperature Tact before the temperature TA of the adsorption layer 352 becomes the desorption temperature Tdes or more if starting irradiation of microwaves to the microwave absorber contained in the catalyst layer 353 at the time when the temperature TA of the adsorption layer 352 becomes the irradiation start temperature Tmw.

At step S4, the electronic control unit 200 reads the estimated amount of hydrocarbons QHC adsorbed at the adsorption layer 352 calculated at any time during engine operation separately from the present routine (below, referred to as the "estimated adsorption amount").

The estimated adsorption amount QHC can, for example, be calculated in the following way. That is, the amount of hydrocarbons discharged per unit time from the engine body 1 fluctuates in accordance with the exhaust air-fuel ratio or other aspects of the engine operating state. Further, the amount of hydrocarbons desorbed per unit time from the adsorption layer 352 basically is dependent on the temperature TA of the adsorption layer 352. Therefore, the electronic control unit 200 refers to a map prepared in advance by experiments etc. and calculates as required the amount of hydrocarbons adsorbed per unit time at the adsorption layer 352 (positive value) in the hydrocarbons discharged from the engine body 1 and the amount of hydrocarbons desorbed per unit time from the adsorption layer 352 (negative value) based on the engine operating state and the temperature TA of the adsorption layer 352 and calculates as required the sum of these as the estimated adsorption amount QHC.

At step S5, the electronic control unit 200 judges if the estimated adsorption amount QHC is larger than a predetermined irradiation start adsorption amount Qmw. If the estimated adsorption amount QHC is larger than the irradiation start adsorption amount Qmw, the electronic control unit 200 proceeds to the processing of step S6. On the other hand, if the estimated adsorption amount QHC is the irradiation start adsorption amount Qmw or less, the electronic control unit 200 proceeds to the processing of step S10.

The irradiation start adsorption amount Qmw is the amount of adsorption becoming the threshold value for start of irradiation of microwaves to the microwave absorber contained in the catalyst layer 353. It is set to an amount of adsorption of an extent where even if the state becomes one where hydrocarbons adsorbed at the adsorption layer 352 are desorbed from the adsorption layer 352 and are discharged to the outside air without being sufficiently removed at the catalyst layer 353, no problem arises in the exhaust performance. In the present embodiment, the irradiation start adsorption amount Qmw is set to zero.

At step S6, the electronic control unit 200 judges if the temperature TC of the catalyst layer 353 is less than the oxidation activation temperature Tact. If the temperature TC of the catalyst layer 353 is less than the oxidation activation temperature Tact, the electronic control unit 200 proceeds to the processing of step S7. On the other hand, if the temperature TC of the catalyst layer 353 is the oxidation activation temperature Tact or more, the electronic control unit 200 proceeds to the processing of step S10.

At step S7, the electronic control unit 200 drives the microwave irradiation device 34 to irradiate microwaves to the catalytic converter 35 and make the microwave absorber contained in the catalyst layer 353 generate heat.

At step S8, the electronic control unit 200 adds to the temperature TC of the catalyst layer 353 the temperature rise ΔTmw (° C.) of the catalyst layer 353 per unit time due to the thermal energy generated by the microwave absorber so as to update the temperature TC of the catalyst layer 353. The temperature rise ΔTmw (° C.) of the catalyst layer 353 due to the thermal energy generated by the microwave absorber can for example be made a predetermined value determined in advance by experiments etc.

At step S9, the electronic control unit 200 adds to the temperature TA of the adsorption layer 352 the temperature rise ΔTAeng (° C.) of the adsorption layer 352 per unit time due to the thermal energy of the exhaust discharged from the engine body 1 so as to update the temperature TA of the adsorption layer 352. Further, similarly, the electronic control unit 200 adds to the temperature TC of the catalyst layer 353 the temperature rise ΔTCeng (° C.) of the catalyst layer 353 per unit time due to the thermal energy of the exhaust discharged from the engine body 1 to update the temperature TC of the catalyst layer 353.

Here, the thermal energy of the exhaust basically depends on the load of the internal combustion engine 100 and other aspects of the engine operating state. For this reason, the temperature rise ΔTCeng of the catalyst layer 353 formed at the upper layer of the substrate 351 can, for example, be calculated based on the engine operating state. Further, the temperature rise ΔTAeng of the adsorption layer 352 formed at the lower layer of the substrate 351 is affected by the temperature difference from the catalyst layer 353, so, for example, can be calculated based on the engine operating state and the temperature difference from the catalyst layer 353.

At step S10, if irradiating microwaves, the electronic control unit 200 stops the irradiation of microwaves and proceeds to the processing of step S9, while if not irradiating microwaves, proceeds as is to the processing of step S9.

The above explained exhaust after treatment system 33 according to the present embodiment provided in an exhaust passage of an internal combustion engine 100 comprises an adsorption layer 352 having the function of adsorbing hydrocarbons in the exhaust, a catalyst layer 353 arranged at the same position as the adsorption layer 352 in the direction of flow of exhaust and having an oxidation function of oxidizing the hydrocarbons desorbed from the adsorption layer 352, and a thermal energy generator generating thermal energy. In the thermal energy generated by the thermal energy generator, the thermal energy supplied to the catalyst layer 353 is made larger than the thermal energy supplied to the adsorption layer 352.

Due to this, at the time of cold start of the internal combustion engine 100 or otherwise where it is necessary to activate the oxidation function of the catalyst layer 353, the thermal energy generator may be used to generate thermal energy to thereby make the temperature elevation rate of the catalyst layer 353 faster than the temperature elevation rate of the adsorption layer 352. For this reason, before the temperature of the catalyst layer 353 becomes the oxidation activation temperature Tact higher than the desorption temperature Tdes or becomes more, the temperature of the adsorption layer 352 can be kept from becoming the desorption temperature Tdes or more. That is, it is possible to keep hydrocarbons from being desorbed from the adsorption layer 352 before the oxidation function of the catalyst layer 353 is activated. For this reason, it is possible to keep down the amount of external discharge of hydrocarbons before the oxidation function of the catalyst layer 353 becomes activated.

In the present embodiment, the exhaust after treatment system 33 is provided with a microwave irradiation device 34 configured to irradiate microwaves toward the catalyst layer 353. The thermal energy generator is the microwave absorber contained in the catalyst layer 353 and generating heat when irradiated by microwaves. Due to this, it is possible to make the microwave absorber contained in the catalyst layer 353 generate heat and directly heat the catalyst layer 353. For this reason, in the thermal energy generated by firing microwaves at the microwave absorber, the thermal energy supplied to the catalyst layer 353 can be made larger than the thermal energy supplied to the adsorption layer 352.

At this time, by forming the adsorption layer 352 and catalyst layer 353 at the same position of the surface of the substrate 351 in layers so that the adsorption layer 352 becomes the lower layer and the catalyst layer 353 becomes the upper layer, the following effects can be obtained.

That is, inside the catalytic converter 35, the adsorption layer 352 does not directly contact the gas phase (exhaust), so the hydrocarbons desorbed from the adsorption layer 352 are necessarily discharged to the gas phase through the catalyst layer 353 and are not directly discharged to the gas phase. Therefore, the hydrocarbons desorbed from the adsorption layer 352 are kept from being directly discharged to the gas phase without being oxidized at the catalyst layer 353 and from being discharged to the outside.

Further, the exhaust after treatment system 33 according to the present embodiment is provided with an electronic control unit 200 (control device) controlling the thermal energy generated by the thermal energy generator. The electronic control unit 200 is configured so that when the temperature of the adsorption layer 352 is a predetermined irradiation start temperature Tmw lower than a predetermined desorption temperature Tdes at which hydrocarbons start to be desorbed from the adsorption layer 352 or is more, it uses the thermal energy generator to generate thermal energy until the temperature of the catalyst layer 353 becomes an oxidation activation temperature Tact which is higher than the desorption temperature Tdes and where the oxidation function is activated or becomes more. Due to this, it is possible to control the temperature of the catalyst layer 353 to become the oxidation activation temperature Tact before the temperature of the adsorption layer 352 becomes the desorption temperature Tdes.

Second Embodiment

Next, a second embodiment of the present disclosure will be explained. The present embodiment differs from the first embodiment on the point of forcibly making the hydrocarbons adsorbed on the adsorption layer 352 be desorbed from the adsorption layer 352 in accordance with need as purge control. Below, this point of difference will be focused on in the explanation.

If after the startup of the internal combustion engine 100, the internal combustion engine 100 is repeatedly stopped before the temperature TA of the adsorption layer 352 becomes the desorption temperature Tdes or more, the amount of the hydrocarbons adsorbed at the adsorption layer 352 is liable to end up exceeding the upper limit value of the amount of hydrocarbons which can be adsorbed at the adsorption layer 352. This being so, when next starting up the internal combustion engine 100, hydrocarbons can no longer be adsorbed at the adsorption layer 352, so the amount of external discharge of hydrocarbons is liable to increase.

Therefore, in the present embodiment, for example, when the internal combustion engine 100 is stopped, if the estimated adsorption amount QHC becomes a predetermined purge start adsorption amount Qlim or more and the oxygen required for oxidizing the hydrocarbons is present, it is decided to drive the microwave irradiation device 34 to irradiate microwaves at the catalytic converter 35. Further, due to this, it is decided to make the microwave absorber contained in the catalyst layer 353 of the catalytic converter 35 generate heat to indirectly heat the adsorption layer 352 and forcibly make the hydrocarbons be desorbed from the adsorption layer 352.

Figure 4:
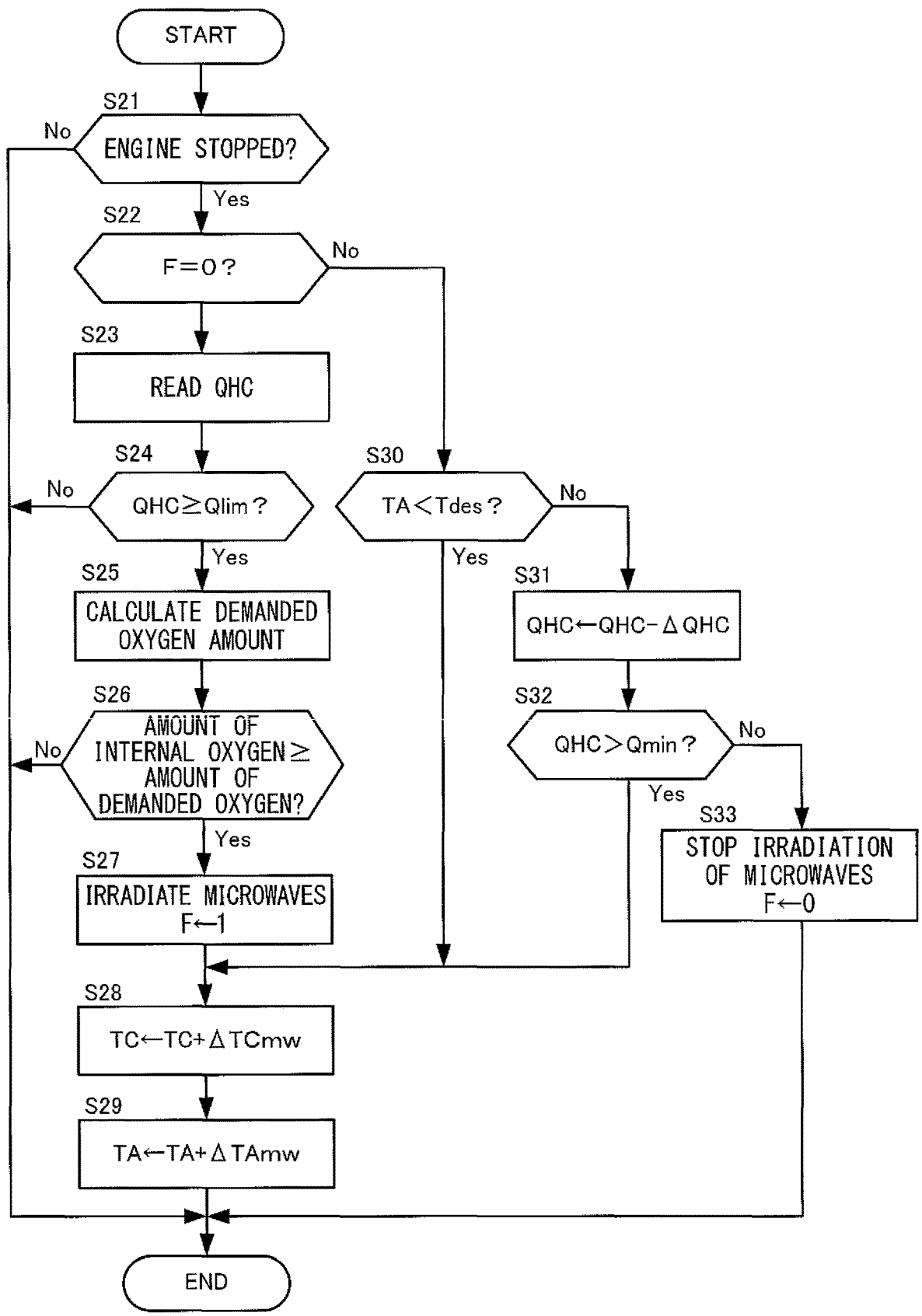
FIG. 4 is a flow chart explaining purge control according to a second embodiment of the present disclosure.

FIG. 4 is a flow chart explaining purge control according to the present embodiment. The electronic control unit 200 for example repeatedly performs the present routine at predetermined processing cycles while the engine is stopped.

At step S21, the electronic control unit 200 judges if the engine is stopped. If the engine is stopped, the electronic control unit 200 proceeds to the processing of step S22. On the other hand, if the engine is not stopped, the electronic control unit 200 ends the current processing.

At step S22, the electronic control unit 200 judges if a stop irradiation flag F is set to "0". A stop irradiation flag F is a flag which is set to "1" when microwaves are being irradiated while the engine is stopped. Its initial value is set to "0". If the stop irradiation flag F is set to "0", the electronic control unit 200 proceeds to the processing of step S23. On the other hand, if the stop irradiation flag F is not set to "0", the electronic control unit 200 proceeds to the processing of step S30.

At step S23, the electronic control unit 200 reads the estimated adsorption amount QHC of the adsorption layer 352 calculated as required during engine operation separately from the present routine.

At step S24, the electronic control unit 200 judges if the estimated adsorption amount QHC is a purge start adsorption amount Qlim or more. If the estimated adsorption amount QHC is the purge start adsorption amount Qlim or more, the electronic control unit 200 proceeds to the processing of step S25. On the other hand, if the estimated adsorption amount QHC is less than the purge start adsorption amount Qlim, the electronic control unit 200 ends the current processing. Note that the purge start adsorption amount Qlim is a value smaller than the upper limit value of the amount of hydrocarbons which can be adsorbed at the adsorption layer 352.

At step S25, the electronic control unit 200 refers to a table etc. prepared in advance by experiments etc. and calculates the amount of oxygen required for oxidizing the amount of hydrocarbons corresponding to the estimated adsorption amount QHC (below, referred to as the "demanded oxygen amount") based on the estimated adsorption amount QHC.

At step S26, the electronic control unit 200 judges if the amount of oxygen inside the catalytic converter 35 is the demanded oxygen amount or more. Note that the amount of internal oxygen can for example be made the amount of oxygen stored in the catalyst layer 353 when the catalyst layer 353 contains a substance having an oxygen storage ability (for example, ceria ($CeO_2$)). Further, it can be made the amount of oxygen in the exhaust passage corresponding to the engine operating state before stopping the engine and can also be made the total of these. If the amount of internal oxygen is the demanded oxygen amount or more, the electronic control unit 200 proceeds to the processing of step S27. On the other hand, if the amount of internal oxygen is less than the demanded oxygen amount, the electronic control unit 200 ends the current processing.

At step S27, the electronic control unit 200 drives the microwave irradiation device 34 to irradiate microwaves and sets the stop irradiation flag F to "1". Due to this, it makes the microwave absorber contained in the catalyst layer 353 generate heat to directly heat the catalyst layer 353 and indirectly heat the adsorption layer 352.

At step S28, the electronic control unit 200 adds to the temperature TC of the catalyst layer 353 before stopping the engine the temperature rise ΔTCmw of the catalyst layer 353 per unit time due to the thermal energy generated by the microwave absorber to update the temperature TC of the catalyst layer 353.

At step S29, the electronic control unit 200 adds to the temperature TA of the adsorption layer 352 before stopping the engine the temperature rise ΔTAmw (° C.) of the adsorption layer 352 per unit time due to the thermal energy generated by the microwave absorber so as to update the temperature TA of the adsorption layer 352. The temperature rise ΔTAmw (° C.) of the adsorption layer 352 due to the thermal energy generated by the microwave absorber can, for example, be calculated based on the temperature difference from the catalyst layer 353.

At step S30, the electronic control unit 200 judges if the temperature TA of the adsorption layer 352 is less than the desorption temperature Tdes. If the temperature TA of the adsorption layer 352 is less than the desorption temperature Tdes, the electronic control unit 200 proceeds to the processing of step S28. On the other hand, if the temperature TA of the adsorption layer 352 is the desorption temperature Tdes or more, the electronic control unit 200 proceeds to the processing of step S31.

At step S31, the electronic control unit 200 subtracts from the estimated adsorption amount QHC the desorption amount ΔQHC of the hydrocarbons desorbed per unit time from the adsorption layer 352 to update the estimated adsorption amount QHC. Note that, when the temperature TA of the adsorption layer 352 becomes the desorption temperature Tdes or more, basically the temperature of the catalyst layer 353 also becomes the oxidation activation temperature Tact or more, so the hydrocarbons desorbed from the adsorption layer 352 are oxidized at the catalyst layer 353.

At step S32, the electronic control unit 200 judges if the estimated adsorption amount QHC is larger than a predetermined irradiation stop adsorption amount Qmin. The irradiation stop adsorption amount Qmin is the amount of adsorption becoming the threshold value for ending the purge control and is for example set to zero. If the estimated adsorption amount QHC is larger than the irradiation stop adsorption amount Qmin, the electronic control unit 200 proceeds to the processing of step S28. On the other hand, if the estimated adsorption amount QHC is the irradiation stop adsorption amount Qmin or less, the electronic control unit 200 proceeds to the processing of step S33.

At step S33, the electronic control unit 200 stops the irradiation of microwaves and sets the stop irradiation flag F to "0".

According to the present embodiment explained above, the electronic control unit 200 is configured so that when the internal combustion engine 100 is stopped, if the estimated adsorption amount QHC of the hydrocarbons adsorbed at the adsorption layer 352 is a predetermined purge start adsorption amount Qlim (first adsorption amount) or more and the oxygen required for oxidizing the hydrocarbons at the catalyst layer 353 is present, it uses the thermal energy generator to generate thermal energy until the estimated adsorption amount QHC becomes a predetermined irradiation stop adsorption amount Qmin (second adsorption amount) smaller than the purge start adsorption amount Qlim.

Due to this, at the time of startup of the internal combustion engine 100, it is possible to keep the amount of adsorption of hydrocarbons at the adsorption layer 352 from reaching the upper limit and hydrocarbons no longer being able to be adsorbed. For this reason, it is possible to keep the amount of discharge of hydrocarbons from increasing at the time of startup of the internal combustion engine 100.

Third Embodiment

Next, a third embodiment of the present disclosure will be explained. The present embodiment differs from the second embodiment on the point of enabling air to be fed to the catalytic converter 35 if the amount of oxygen is short of the required amount for oxidizing the hydrocarbons at the time of purge control. Below, this point of difference will be focused on in the explanation.

Figure 5:
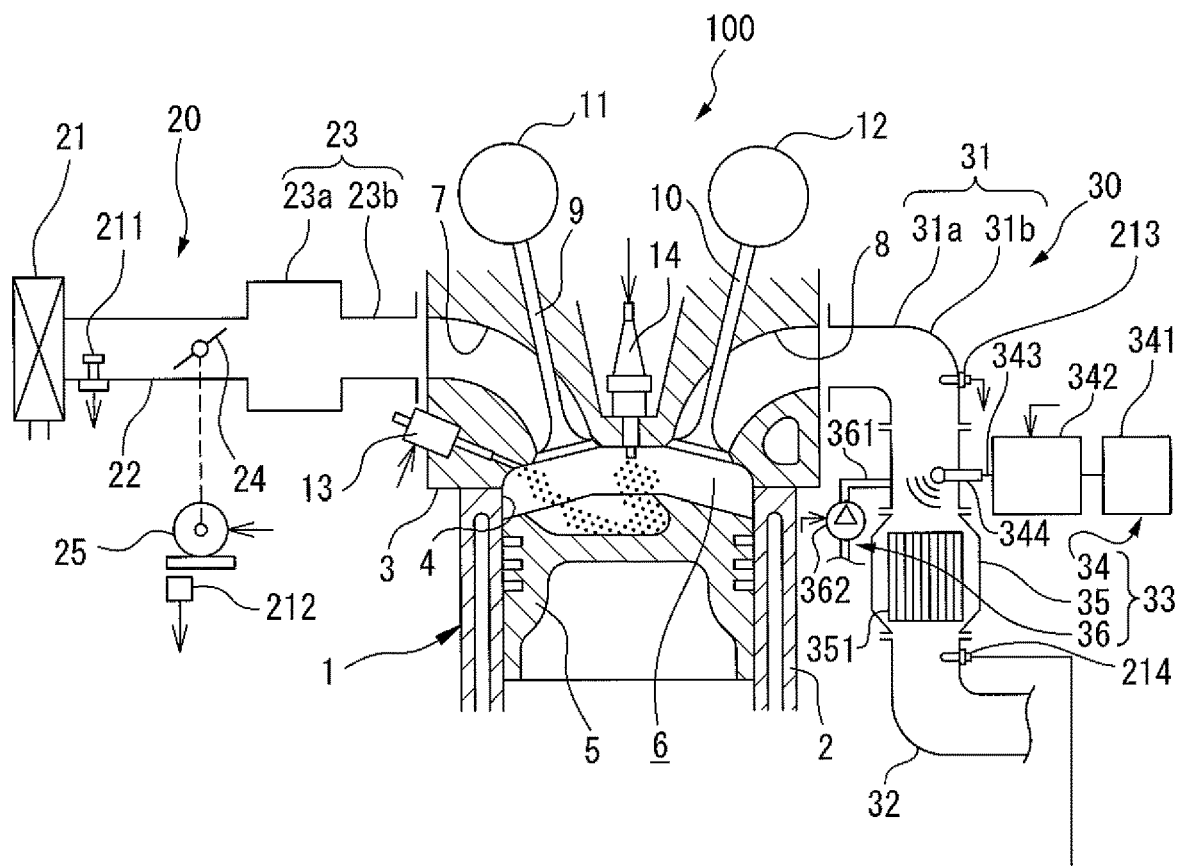
FIG. 5 is a schematic view of the configuration of an internal combustion engine and an electronic control unit controlling the internal combustion engine according to a third embodiment of the present disclosure.
Figure 5:
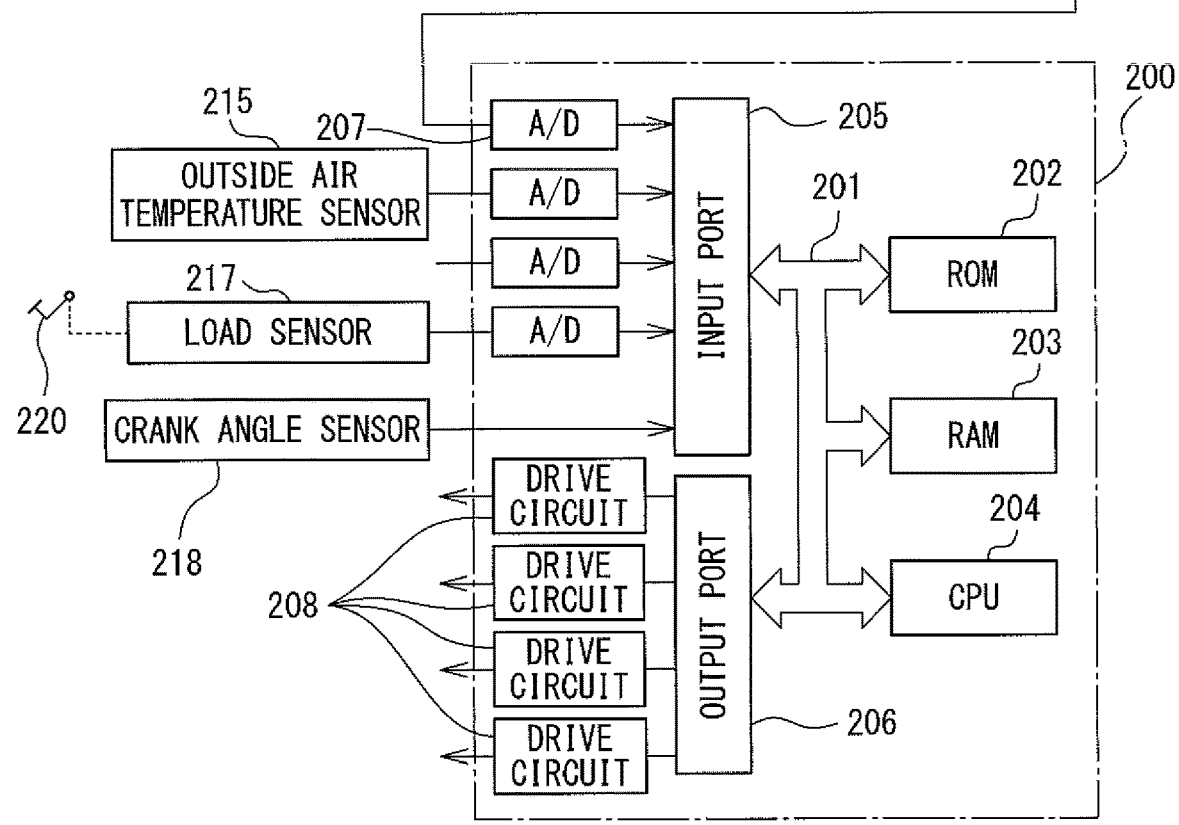

FIG. 5 is a schematic view of the configuration of the internal combustion engine 100 and electronic control unit 200 for controlling the internal combustion engine 100 according to the present embodiment.

As shown in FIG. 5, the exhaust after treatment system 33 of the internal combustion engine 100 according to the present embodiment is provided with an air feed device 36 in addition to the microwave irradiation device 34 and the catalytic converter 35.

The air feed device 36 is provided with an air introduction pipe 361 connected to the exhaust pipe 32 at the upstream side from the catalytic converter 35 in the direction of flow of exhaust and a pump 362 for pumping secondary air (outside air) through the air introduction pipe 361 to the exhaust pipe 32 and in turn the catalytic converter 35.

Due to this, in the above-mentioned second embodiment, at step S26 of the flow chart of FIG. 4, if the amount of internal oxygen is less than the demanded oxygen amount, the microwaves were not irradiated and purge control was ended, but in the present embodiment, in this case as well, the pump 362 may be driven to introduce air to the exhaust pipe 32 and thereby perform purge control.

According to the present embodiment explained above, the exhaust after treatment system 33 is provided with an air feed device 36 feeding air to the exhaust pipe 32 (exhaust passage) at the upstream side from the catalyst layer 353 in the direction of flow of exhaust. The electronic control unit 200 is configured so as to feed air to the exhaust pipe 32 by the air feed device 36 when the amount of oxygen is short of the required amount for oxidizing the hydrocarbons at the catalyst layer 353.

Due to this, when the engine is stopped, it is possible to constantly perform purge control if the estimated adsorption amount QHC is the purge start adsorption amount Qlim or more. For this reason, at the time of engine startup, it is possible to reliably prevent the amount of adsorption of hydrocarbons at the adsorption layer 352 from reaching the upper limit and hydrocarbons not being able to be adsorbed any longer and thereby prevent the amount of discharge of hydrocarbons from increasing at the time of engine startup.

Fourth Embodiment

Next, a fourth embodiment of the present disclosure will be explained. The present embodiment differs from the first embodiment in the configuration of the exhaust after treatment system 33. Below, this point of difference will be focused on in the explanation.

Figure 6:
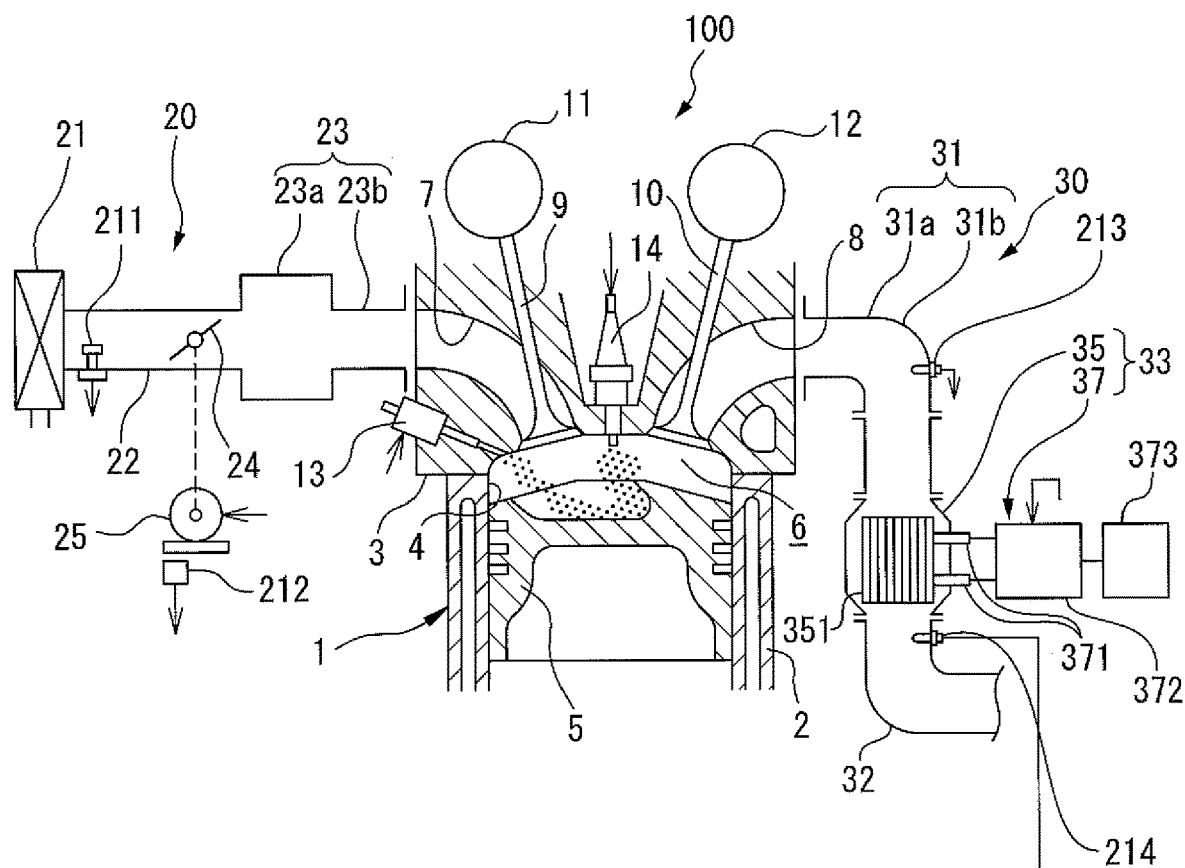
FIG. 6 is a schematic view of the configuration of an internal combustion engine and an electronic control unit controlling the internal combustion engine according to a fourth embodiment of the present disclosure.
Figure 6:
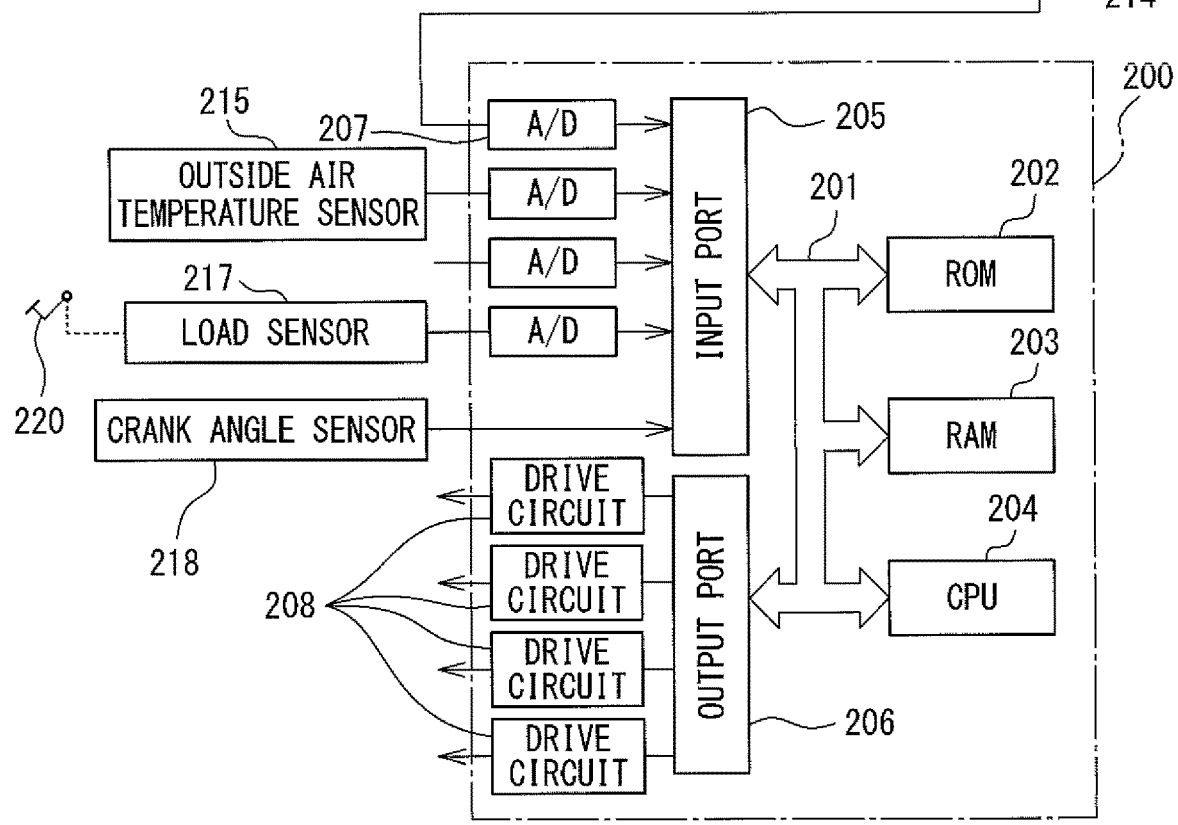

FIG. 6 is a schematic view of the configuration of the internal combustion engine 100 and electronic control unit 200 for controlling the internal combustion engine 100 according to the present embodiment.

In the above-mentioned first embodiment, the microwave absorber contained in the catalyst layer 353 was irradiated by microwaves to make the microwave absorber generate heat and thereby heat the catalyst layer 353.

As opposed to this, in the present embodiment, the substrate 351 is for example formed by silicon carbide (SiC) or molybdenum disilicide ($MoSi_2$) or another material generating heat upon being energized. The substrate 351 is energized to make the substrate 351 generate heat to thereby heat the catalyst layer 353.

For this reason, the exhaust after treatment system 33 according to the present embodiment is provided with the catalyst converter 35 and the electrical heating device 37 for energizing the substrate 351 to make the substrate 351 generate heat.

The electrical heating device 37 is provided with a pair of electrodes 371 for applying voltage to the substrate 351. The pair of electrodes 371 are electrically connected to the substrate 351 in respectively electrically insulated states and are connected to the electrical heating-use power supply 373 through a voltage adjustment circuit 372 for adjusting the voltage applied to the substrate 351. The electrical heating-use power supply 373 may also be a dedicated power supply. Further, if the internal combustion engine 100 is mounted in a vehicle, it may also be the vehicular use battery.

By applying voltage through the pair of electrodes 371 to the substrate 351 to supply electric power to the substrate 351, current flows to the substrate 351 and the substrate 351 generates heat. The voltage applied by the pair of electrodes 371 to the substrate 351 can be adjusted by using the electronic control unit 200 to control the voltage adjustment circuit 372. For example, it is also possible to apply voltage of the electrical heating-use power supply 373 as it is and to apply voltage of the electrical heating-use power supply 373 adjusted to any voltage.

Figure 7:
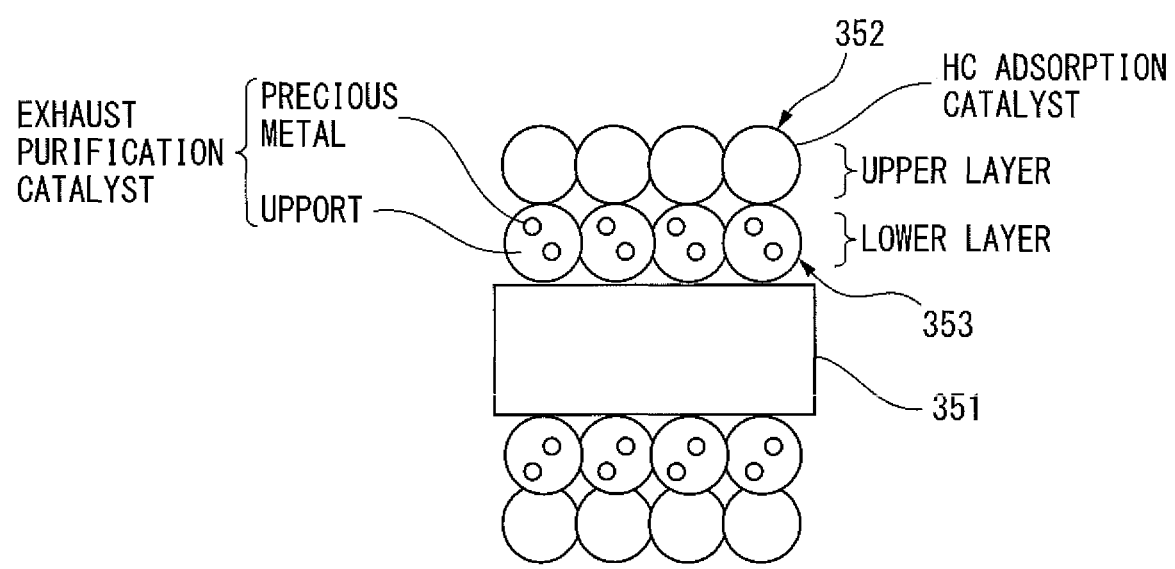
FIG. 7 is an enlarged view of principal parts of a substrate according to the fourth embodiment of the present disclosure along the direction of flow of exhaust.

FIG. 7 is an enlarged view of principal parts of the substrate 351 of the present embodiment along the direction of flow of exhaust.

As shown in FIG. 7, the surface of the substrate 351 is formed with an adsorption layer 352 and a catalyst layer 353. Note that the catalyst layer 353 according to the present embodiment does not contain a microwave absorber.

Further, if, like in the present embodiment, heating the catalyst layer 353 through the substrate 351, in the thermal energy generated by the substrate 351, to make the thermal energy supplied to the catalyst layer 353 larger than the thermal energy supplied to the adsorption layer 352, it is necessary to form the catalyst layer 353 on the surface of the substrate 351 and form the adsorption layer 352 on the surface of the catalyst layer 353. That is, in the present embodiment, the adsorption layer 352 and the catalyst layer 353 are arranged at the same position in the direction of flow of exhaust and the adsorption layer 352 and the catalyst layer 353 are formed on the surface of the substrate 351 in layers so that the lower layer becomes the catalyst layer 353 and the upper layer becomes the adsorption layer 352.

Figure 8:
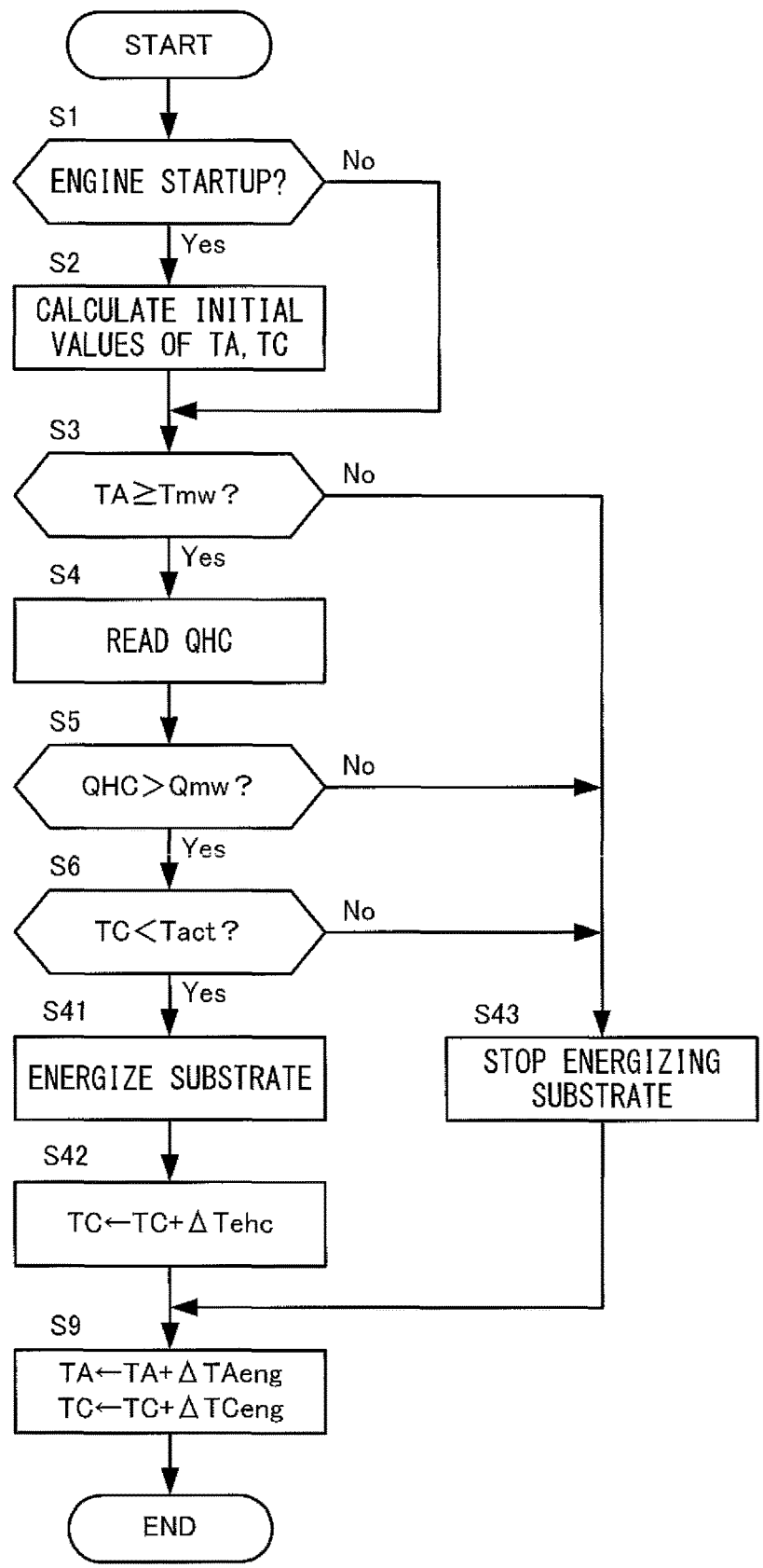
FIG. 8 is a flow chart explaining catalyst warm-up control according to the fourth embodiment of the present disclosure.

FIG. 8 is a flow chart explaining catalyst warm-up control according to the present embodiment. The electronic control unit 200 for example repeatedly performs the present routine at predetermined processing cycles during engine operation. Note that in the flow chart of FIG. 8, at step S1 to step S6 and step S9, processing similar to the first embodiment is performed, so here the explanation will be omitted.

At step S41, the electronic control unit 200 energizes the substrate 351 to make the substrate 351 generate heat.

At step S42, the electronic control unit 200 adds to the temperature TC of the catalyst layer layer 353 the temperature rise $\Delta Tehc$ (° C.) of the catalyst layer 353 per unit time due to the thermal energy generated by the substrate 351 to update the temperature TC of the catalyst layer 353. The temperature rise $\Delta Tehe$ (° C.) of the catalyst layer 353 due to the thermal energy generated by the substrate 351 can, for example, be made a predetermined value determined in advance by experiments etc.

At step S43, if energizing the substrate 351, the electronic control unit 200 stops the energization and proceeds to the processing of step S8. If not energizing the substrate 351, it proceeds to the processing of step S8 as is.

According to the present embodiment explained above, the exhaust after treatment system 33 is provided with an electrical heating device 37 for energizing the substrate 351 to make the substrate 351 generate heat. The thermal energy generator is the substrate 351 generating heat upon being energized. The adsorption layer 352 and the catalyst layer 353 are formed at the same position at the surface of the substrate 351 in layers so that the adsorption layer 352 becomes the upper layer and the catalyst layer 353 becomes the lower layer. Even if configuring the exhaust after treatment system 33 in this way, it is possible to obtain similar advantageous effects to the above-mentioned first embodiment.

Fifth Embodiment

Next, a fifth embodiment of the present disclosure will be explained. The present embodiment differs from the fourth embodiment in the configuration of the exhaust after treatment system 33. Below, this point of difference will be focused on in the explanation.

Figure 9:
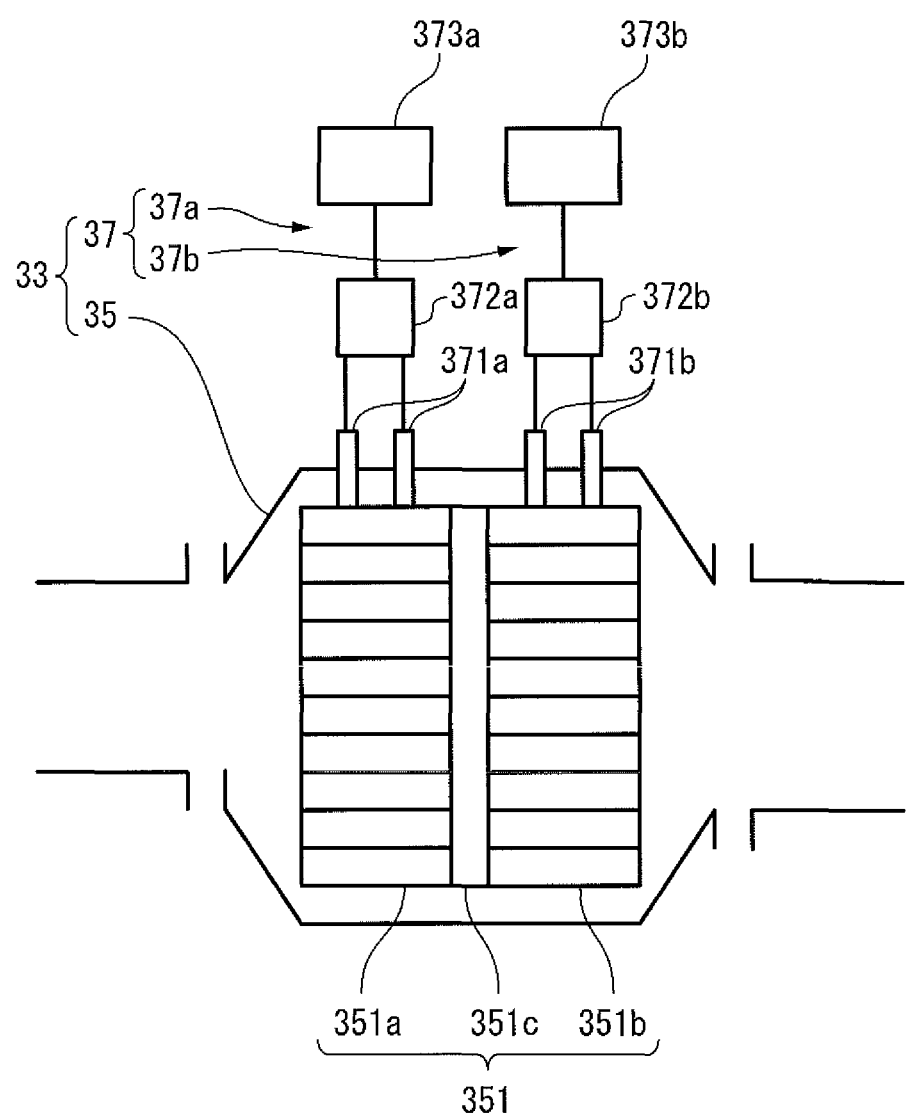
FIG. 9 is a schematic view of the configuration of an exhaust after treatment system according to a sixth embodiment of the present disclosure.
Figure 10:
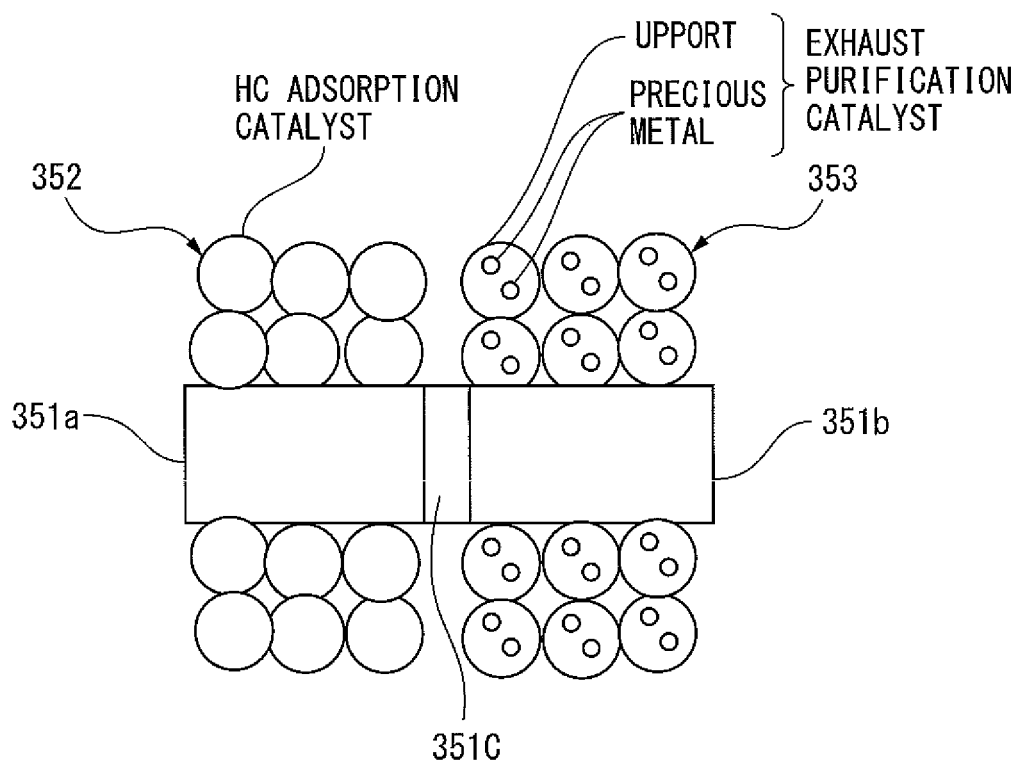
FIG. 10 is an enlarged view of principal parts of a substrate according to the sixth embodiment of the present disclosure along the direction of flow of exhaust.

FIG. 9 is a schematic view of the configuration of the exhaust after treatment system 33 according to the present embodiment. FIG. 10 is an enlarged view of principal parts of the substrate 351 of the catalytic converter 35 according to the present embodiment along the direction of flow of exhaust.

As shown in FIG. 9 and FIG. 10, the substrate 351 of the catalytic converter 35 according to the present embodiment is provided with a first heat generating part 351a, a second heat generating part 351b formed at the downstream side in the direction of flow of exhaust from the first heat generating part 351a, and an insulating part 351c provided between the first heat generating part 351a and the second heat generating part 351b and electrically insulating the first heat generating part 351a and the second heat generating part 351b.

Further, the exhaust after treatment system 33 according to the present embodiment is provided with two electrical heating devices 37a, 37b so as to enable the first heat generating part 351a and the second heat generating part 351b to be respectively independently supplied with electric power. The electrical heating devices 37a, 37b are configured in the same way as those of the above-mentioned fourth embodiment, but in the present embodiment, the amount of electric power supplied per unit time to the second heat generating part 351b is made greater than the amount of electric power supplied per unit time to the first heat generating part 351a.

As the method for making the amount of electric power supplied per unit time to the second heat generating part 351b larger than the amount of electric power supplied per unit time to the first heat generating part 351a, for example, making the electrical heating-use power supply 373b of the electrical heating device 37b supplying electric power to the second heat generating part 351b a higher voltage power supply than the electrical heating-use power supply 373a of the electrical heating device 37a supplying electric power to the first heat generating part 351a to make the voltage applied to the second heat generating part 351b higher than the voltage applied to the first heat generating part 351a may be mentioned. Further, other than this, controlling the voltage adjustment circuits 372a, 372b of the electrical heating devices 37a, 37b by the electronic control unit 200 to make the voltage applied to the second heat generating part 351b higher than the voltage applied to the first heat generating part 351a may be mentioned.

By making the amount of electric power supplied per unit time to the second heat generating part 351b larger than the amount of electric power supplied per unit time to the first heat generating part 351a in this way, it is possible to make the thermal energy generated at the second heat generating part 351b larger than the thermal energy generated at the first heat generating part 351a.

Further, as shown in FIG. 10, in the present embodiment, the surface of the first heat generating part 351a is formed with an adsorption layer 352, the surface of the second heat generating part 351b is formed with a catalyst layer 353, and the adsorption layer 352 and the catalyst layer 353 are respectively separately formed at the substrate layer 351 in the direction of flow of exhaust so that the catalyst layer 353 is arranged at the downstream side in the direction of flow of exhaust from the adsorption layer 352.

Due to this, the temperature elevation rate of the catalyst layer 353 can be made faster than the temperature elevation rate of the adsorption layer 352, so the temperature of the catalyst layer 353 can be made to rise to the oxidation activation temperature Tact before the temperature of the adsorption layer 352 becomes the desorption temperature Tdes or more.

The exhaust after treatment system 33 according to the present embodiment explained above is provided with an adsorption layer 352 having the function of adsorbing hydrocarbons in the exhaust, a catalyst layer 353 arranged at the downstream side from the adsorption layer 352 in the direction of flow of exhaust and having an oxidation function of oxidizing the hydrocarbons desorbed from the adsorption layer 352, and a thermal energy generator generating thermal energy, in the thermal energy generated by the thermal energy generator, the thermal energy supplied to the catalyst layer 353 being made larger than the thermal energy supplied to the adsorption layer 352.

In the present embodiment, the exhaust after treatment system 33 is provided with the electrical heating device 37 for energizing the substrate 351 to make the substrate 351 generate heat. The thermal energy generator is the substrate 351 generating heat by being energized. The substrate 351 is provided with the first heat generating part 351a and the second heat generating part 351b formed at the downstream side in the direction of flow of exhaust from the first heat generating part 351a and generating a larger thermal energy than the first heat generating part 351a. The adsorption layer 352 is formed at the surface of the first heat generating part 351a, while the catalyst layer 353 is formed at the surface of the second heat generating part 351b.

Even if configuring the exhaust after treatment system 33 in this way, it is possible to obtain advantageous effects similar to the above-mentioned first embodiment.

Sixth Embodiment

Next, a sixth embodiment of the present disclosure will be explained. The present embodiment differs from the fourth embodiment in the configuration of the exhaust after treatment system 33. Below, this point of difference will be focused on in the explanation.

Figure 11:
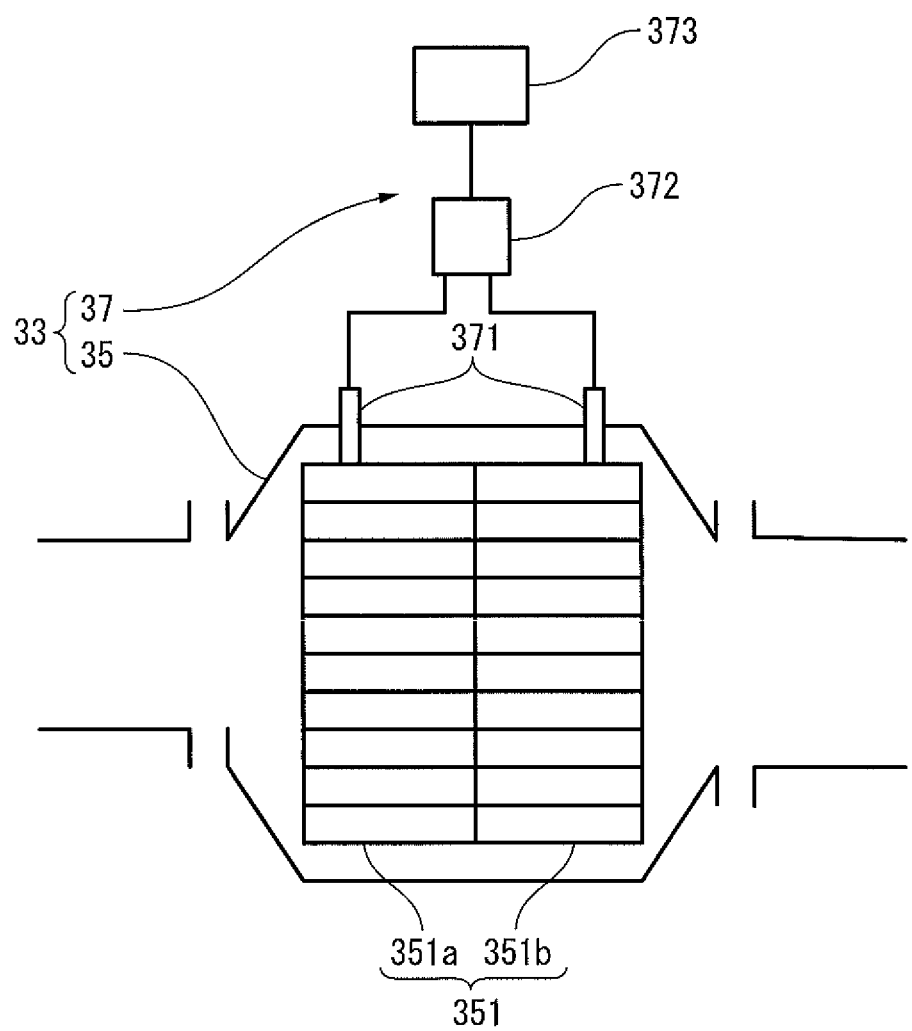
FIG. 11 is a schematic view of the configuration of an exhaust after treatment system according to a sixth embodiment of the present disclosure.
Figure 12:
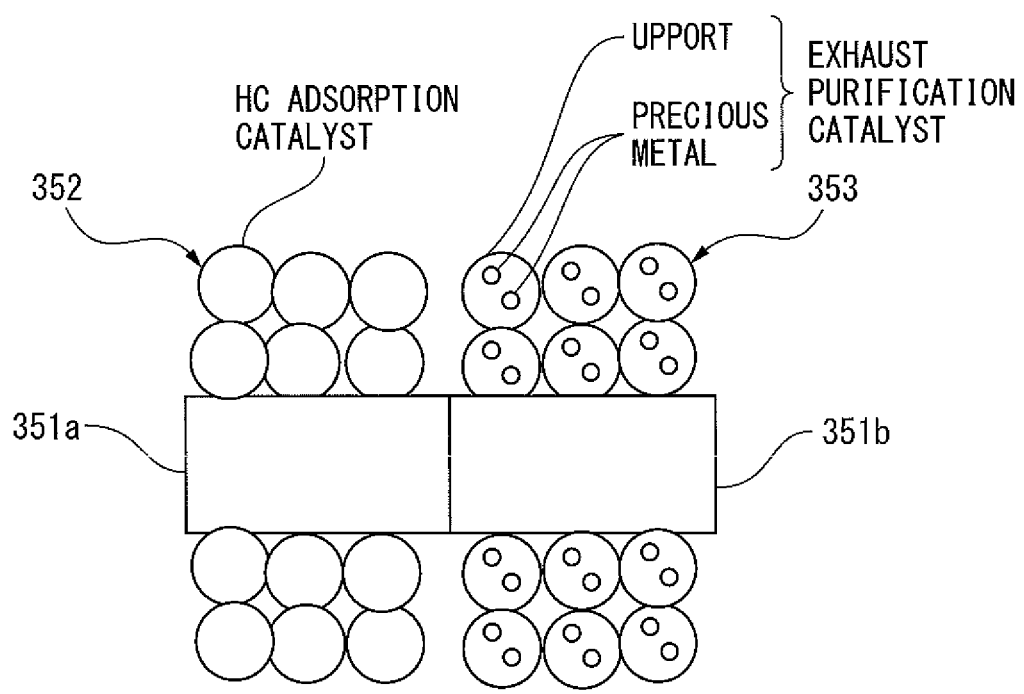
FIG. 12 is an enlarged view of principal parts of a substrate according to the sixth embodiment of the present disclosure along the direction of flow of exhaust.

FIG. 11 is a schematic view of the configuration of the exhaust after treatment system 33 according to the present embodiment. FIG. 12 is an enlarged view of principal parts of the substrate 351 of the catalytic converter 35 according to the present embodiment along the direction of flow of exhaust.

As shown in FIG. 11 and FIG. 12, the substrate 351 of the catalytic converter 35 according to the present embodiment is provided with the first heat generating part 351a and the second heat generating part 351b formed at the downstream side in the direction of flow of exhaust from the first heat generating part 351, while the second heat generating part 351b is configured by a material with a lower resistance value than the first heat generating part 351a.

Due to this, by using the electrical heating device 37 to energize the substrate 351, it is possible to make the thermal energy generated by the second heat generating part 351b configured by a material with a lower resistance value than the first heat generating part 351a larger than the thermal energy generated by the first heat generating part 351a.

For this reason, as shown in FIG. 12, by forming the adsorption layer 352 at the surface of the first heat generating part 351a, forming the catalyst layer 353 at the surface of the second heat generating part 351b, and separately forming the adsorption layer 352 and the catalyst layer 353 at the substrate 351 so that the catalyst layer 353 is arranged in the direction of flow of exhaust at the downstream side in the direction of flow of exhaust from the adsorption layer 352, it is possible to make the temperature elevation rate of the catalyst layer 353 faster than the temperature elevation rate of the adsorption layer 352. Therefore, it is possible to make the temperature of the catalyst layer 353 rice to the oxidation activation temperature Tact before the temperature of the adsorption layer 352 becomes the desorption temperature Tdes or more.

In this way, even if forming the second heat generating part 351b by a member with a lower resistance at the time of energization than the first heat generating part 351a and making the thermal energy generated by the second heat generating part 351b greater than the thermal energy generated by the first heat generating part 351a, effects similar to the above-mentioned first embodiment can be obtained.

Above, embodiments of the present disclosure were explained, but the above embodiments only show some of the examples of application of the present disclosure and are not meant to limit the technical scope of the present disclosure to the specific configurations of the embodiments. For example, the above embodiments can be suitably combined.

Further, in the above first embodiment, the same substrate 351 was formed with the adsorption layer 352 and the catalyst layer 353 in layers, but for example it is also possible to provide two catalytic converters 35 in the exhaust pipe 32, form the adsorption layer 352 at the substrate 351 of the catalytic converter 35 at the upstream side in the direction of flow of exhaust and form the catalyst layer 353 containing the microwave absorber at the substrate 351 of the catalytic converter 35 at the downstream side in the direction of flow of exhaust, and irradiate microwaves at the catalytic converter 35 at the downstream side in the direction of flow of exhaust.

The invention claimed is:

1. An exhaust after treatment system provided in an exhaust passage of an internal combustion engine, the exhaust after treatment system comprising:
   an adsorption layer having the function of adsorbing hydrocarbons in the exhaust;
   a catalyst layer arranged at the same position as the adsorption layer in the direction of flow of exhaust or at the downstream side from the adsorption layer and having an oxidation function of oxidizing the hydrocarbons; and
   a thermal energy generator generating thermal energy, wherein
   in the thermal energy generated by the thermal energy generator, the thermal energy supplied to the catalyst layer being made larger than the thermal energy supplied to the adsorption layer; wherein the adsorption layer and the catalyst layer are formed at the same position on the surface of a substrate in layers such that the adsorption layer becomes a lower layer and the catalyst layer becomes an upper layer.

2. The exhaust after treatment system according to claim 1, wherein
   the exhaust after treatment system further comprises a microwave irradiation device configured to irradiate microwaves toward the catalyst layer, and
   the thermal energy generator is a microwave absorber contained in the catalyst layer and generating heat by being irradiated by microwaves.

3. The exhaust after treatment system according to claim 1, wherein
   the exhaust after treatment system further comprises a control device configured to control the thermal energy generated by the thermal energy generator, and,
   when the temperature of the adsorption layer is a predetermined irradiation start temperature lower than a predetermined desorption temperature where hydrocarbons start to be desorbed from the adsorption layer or is more, the control device uses the thermal energy generator to generate thermal energy until the temperature of the catalyst layer becomes a predetermined oxidation activation temperature which is higher than the desorption temperature and at which the oxidation function is activated or becomes more.

4. The exhaust after treatment system according to claim 3, wherein,
   when at the time the internal combustion engine is stopped, the amount of adsorption of hydrocarbons adsorbed at the adsorption layer is a predetermined first amount of adsorption or more and there is oxygen required for oxidizing the hydrocarbons at the catalyst layer, the control device uses the thermal energy generator to generate thermal energy until the amount of adsorption becomes a predetermined second amount of adsorption smaller than the first amount of adsorption.

5. The exhaust after treatment system according to claim 4, wherein
   the exhaust after treatment system further comprises an air feed device configured to feed air to the exhaust passage at the upstream side from the catalyst layer in the direction of flow of exhaust, and
   the control device uses the air feed device to feed air to the exhaust passage when the amount of oxygen is short of the required amount for oxidizing the hydrocarbons at the catalyst layer.

* * * * *